US011408215B2

(12) United States Patent
Lindberg et al.

(10) Patent No.: US 11,408,215 B2
(45) Date of Patent: Aug. 9, 2022

(54) IN MOLD ASSEMBLY OF TWO HINGES

(71) Applicants: MAGNA EXTERIORS INC., Concord (CA); Braendon Lindberg, Oxford, MI (US); Ross J. Parpart, Troy, MI (US)

(72) Inventors: Braendon Lindberg, Oxford, MI (US); Ross J. Parpart, Troy, MI (US)

(73) Assignee: MAGNA EXTERIORS, INC., Concord (CA)

( * ) Notice: Subject to any disclaimer, the term of this patent is extended or adjusted under 35 U.S.C. 154(b) by 73 days.

(21) Appl. No.: 16/495,594

(22) PCT Filed: Mar. 21, 2018

(86) PCT No.: PCT/US2018/023589
§ 371 (c)(1),
(2) Date: Sep. 19, 2019

(87) PCT Pub. No.: WO2018/175602
PCT Pub. Date: Sep. 27, 2018

(65) Prior Publication Data
US 2020/0018102 A1 Jan. 16, 2020

Related U.S. Application Data

(60) Provisional application No. 62/474,369, filed on Mar. 21, 2017.

(51) Int. Cl.
E05D 3/14 (2006.01)
E05D 9/00 (2006.01)
B29L 31/22 (2006.01)

(52) U.S. Cl.
CPC .............. E05D 3/14 (2013.01); E05D 3/145 (2013.01); E05D 9/005 (2013.01);
(Continued)

(58) Field of Classification Search
CPC E05D 9/005; E05D 3/14; E05D 3/142; E05D 3/145; E05D 3/147; E05Y 2800/46; B29L 2031/22
See application file for complete search history.

(56) References Cited

U.S. PATENT DOCUMENTS 2,577,350 A * 12/1951 Morin ................. B29C 45/0017
264/161
3,443,005 A * 5/1969 Braun ................. B29C 45/0017
264/245
(Continued)

FOREIGN PATENT DOCUMENTS

CN 1863657 A 11/2006
GB 2102714 A 2/1983
(Continued)

OTHER PUBLICATIONS

Notification of Transmittal of the International Search Report and the Written Opinion of the International Searching Authority for International Application No. PCT/US2018/023589, dated Jul. 5, 2018.
(Continued)

Primary Examiner — Jeffrey O'Brien
(74) Attorney, Agent, or Firm — Warn Partners P.C.

(57) ABSTRACT

The present invention is directed to a 4-bar kinematic link component and method for forming the 4-bar kinematic link using a single rotary molding tool. The invention eliminates the need to form individual components of the bracket from several different tools, which will then requires additional assembly steps. The 4-bar kinematic link is formed from two different materials each having a different in mold shrinkage value. This allows for hinge pins to be formed through a base component in a way that will prevent sticking of the components together thereby allowing the parts to have it relative to one another using the hinge pin. The final
(Continued)

component is a 4-bar kinematic link that can be used as a 4 bar link mechanism for providing motion.

10 Claims, 10 Drawing Sheets

(52) U.S. Cl.
CPC ....... *B29L 2031/22* (2013.01); *E05Y 2800/46* (2013.01); *E05Y 2800/676* (2013.01); *E05Y 2900/53* (2013.01)

(56) References Cited

U.S. PATENT DOCUMENTS

| | | | | |
|---|---|---|---|---|
| 3,737,270 A * | 6/1973 | Fiddler | ............... | B29C 45/0017 425/542 |
| 4,641,701 A * | 2/1987 | Yamamoto | ............. | B22D 17/24 164/113 |
| 5,167,351 A * | 12/1992 | Prout | ................... | B65F 1/1468 220/840 |
| 5,741,446 A * | 4/1998 | Tahara | ................ | B29C 45/0013 264/1.9 |
| 6,261,499 B1 * | 7/2001 | Okeke | ................ | B29C 45/0017 264/242 |
| 6,506,326 B1 * | 1/2003 | Abbott | .............. | B29C 45/14639 264/104 |
| 6,591,467 B2 * | 7/2003 | Cardona | .............. | B65D 43/165 16/266 |
| 6,611,991 B2 * | 9/2003 | Okeke | ................ | B29C 45/0017 16/224 |
| 7,125,513 B2 * | 10/2006 | Abels | ................ | B29C 45/14754 264/342 R |
| 7,229,582 B2 * | 6/2007 | Yamazaki | ........... | B29C 45/0017 264/242 |
| 7,959,846 B2 * | 6/2011 | White | ..................... | E05D 9/005 264/342 R |
| 9,038,244 B2 * | 5/2015 | Tonelli | ................... | E05D 9/005 16/390 |
| 10,576,765 B2 * | 3/2020 | Brown | ..................... | B41J 29/13 |
| 2002/0033613 A1 | 3/2002 | Auer et al. | | |
| 2007/0228603 A1 * | 10/2007 | White | ................. | B29C 45/0017 264/263 |
| 2008/0134466 A1 * | 6/2008 | Massengill | ......... | B29C 45/0081 16/222 |
| 2016/0134231 A1 * | 5/2016 | Wu | ..................... | C08L 23/0815 136/251 |
| 2020/0181961 A1 * | 6/2020 | Lee | ........................ | B22F 3/225 |
| 2020/0354220 A1 * | 11/2020 | Pedersen | .................. | C08J 5/005 |
| 2020/0386023 A1 * | 12/2020 | Larson | .................. | E05D 11/082 |
| 2021/0001536 A1 * | 1/2021 | Fujioka | .................... | B29C 51/12 |

FOREIGN PATENT DOCUMENTS

| | | |
|---|---|---|
| GB | 2273075 A | 8/1994 |
| GB | 2404893 A | 2/2005 |
| WO | 9530528 A1 | 11/1995 |
| WO | 2008073269 A2 | 6/2008 |

OTHER PUBLICATIONS

European Search Report for application 18716781.2, dated Jun. 23, 2021.

Chinese Office Action for Application No. 201880026337.6; dated Apr. 28, 2021.

* cited by examiner

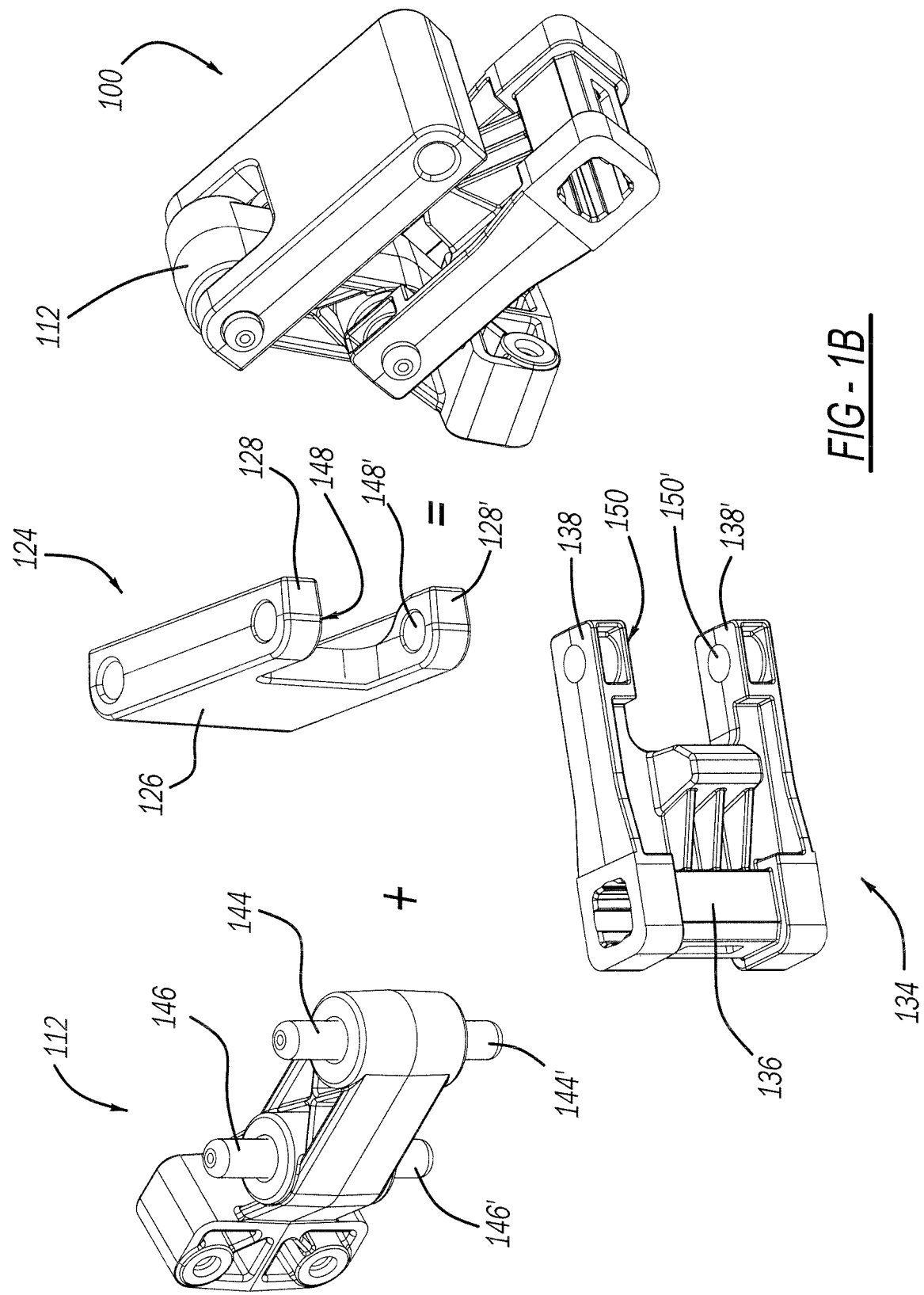

IN MOLD ASSEMBLY OF TWO HINGES

CROSS-REFERENCE TO RELATED APPLICATIONS

This application is a National Stage of PCT International Application No. PCT/US2018/023589 filed Mar. 21, 2018, which claims the benefit of U.S. Provisional Patent Application No. 62/474,369 filed on Mar. 21, 2017. The disclosures of the above applications are incorporated herein by reference.

TECHNICAL FIELD

The present invention generally relates to an in mold process for making a 4-bar kinematic linkage assembly, more specifically the invention relates to a 4-bar kinematic link for an air deflector.

BACKGROUND OF THE INVENTION

With the advent of glass filled and other structural plastics assemblies which are moveable on part with respect to another are being made for hinges and the like. Typically the parts are injection molded separately and then post production assembled using other components such as a pushed in hitch pin or the like for providing the final moveable structure. One such component is a 4-bar kinematic link which is sometimes referred to as a four bar linkage assembly. A four bar linkage assembly can be used for a variety of applications, where it is desirable to move an object vertically without having a lot of horizontal and z-axis space for moving the object. In the automotive field a four bar linkage assembly is useful to move air deflectors such as air dams, spoilers, air screens and wheel well dams. Four bar linkages are also used for moveable running boards that move between an extended and retracted position.

The assembly of a 4-bar kinematic link can require up to four separate injection molding tools which produce separate parts. These parts have build variations and are labor intensive to assemble. Separate parts require a system to track each part as it is shipped and handled. The parts are then post-mold assembled which requires additional equipment, floor space, labor and can include more assembled variation. The steps currently used are shown in the prior art portion of FIG. 2, which shows a multi-piece 4-bar kinematic link 1, that is formed of a base member 2, upper arm 4 and lower arm 6. The upper arm 4 and lower arm 6 are pivotally connected to the base member 2 using separate hinge pins 8, 8' or dowels that slide through apertures of the base member 2, upper arm 4 and lower arm 6. The different pieces of the multi-piece 4-bar kinematic link 1 are formed separately using separate molding tools or by separate processes. All of the components are assembled into the multi-piece bracket 1 during an assembly step 9, where the one piece bracket is assembled by hand or with manual tools, thereby requiring additional labor, time and cost.

Therefore there remains a need in the art for design of a 4-bar kinematic link that allows for in mold assembly reducing assembly time, error proofing, post-mold assembly and equipment.

SUMMARY OF THE INVENTION

The present invention is directed to a 4-bar kinematic link component having a base member formed of a composite material, having at least two sets of a plurality of apertures formed on the surface of the base member. The base member is used to connect the 4-bar kinematic link to an air deflector body or it can be used to connect to the vehicle body directly depending on the particular configuration needed.

The 4-bar kinematic link further includes an upper arm formed of a composite material, the upper arm has a body with two tabs extending from the body and a hinge pin extending between the two tabs. The hinge pin extends rotatably through one of the two sets of plurality of apertures of the base member. The body, hinge pin in two tabs of the upper arm are all integrally formed together as one piece and the hinge pin is formed through the one of the at least two sets of plurality of apertures of the base member to allow the upper arm to pivot about the hinge pin relative to the base member.

The 4-bar kinematic link further includes a lower arm formed of a composite material, the lower arm has a body with two tabs extending from the body and a hinge pin extending between the two tabs. The hinge pin extends rotatably through another one of the two sets of plurality of apertures of the base member. The body, hinge pin in two tabs of the lower arm are all integrally formed together as one piece and the hinge pin is formed through the another one of the at least two sets of plurality of apertures of the base member to allow the lower arm to pivot about the hinge pin relative to the base member. Additionally the lower arm and upper arm each both have a mounting aperture formed through the body to allow the upper and lower arm to be pivotally connected to another object so that the 4-bar kinematic link, when connected to a vehicle and an air deflector, creates a four bar link mechanism that can be moved using an actuator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1B is a schematic view of the 4-bar kinematic link and an overview of the method for forming the 4-bar kinematic link in accordance with a second embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
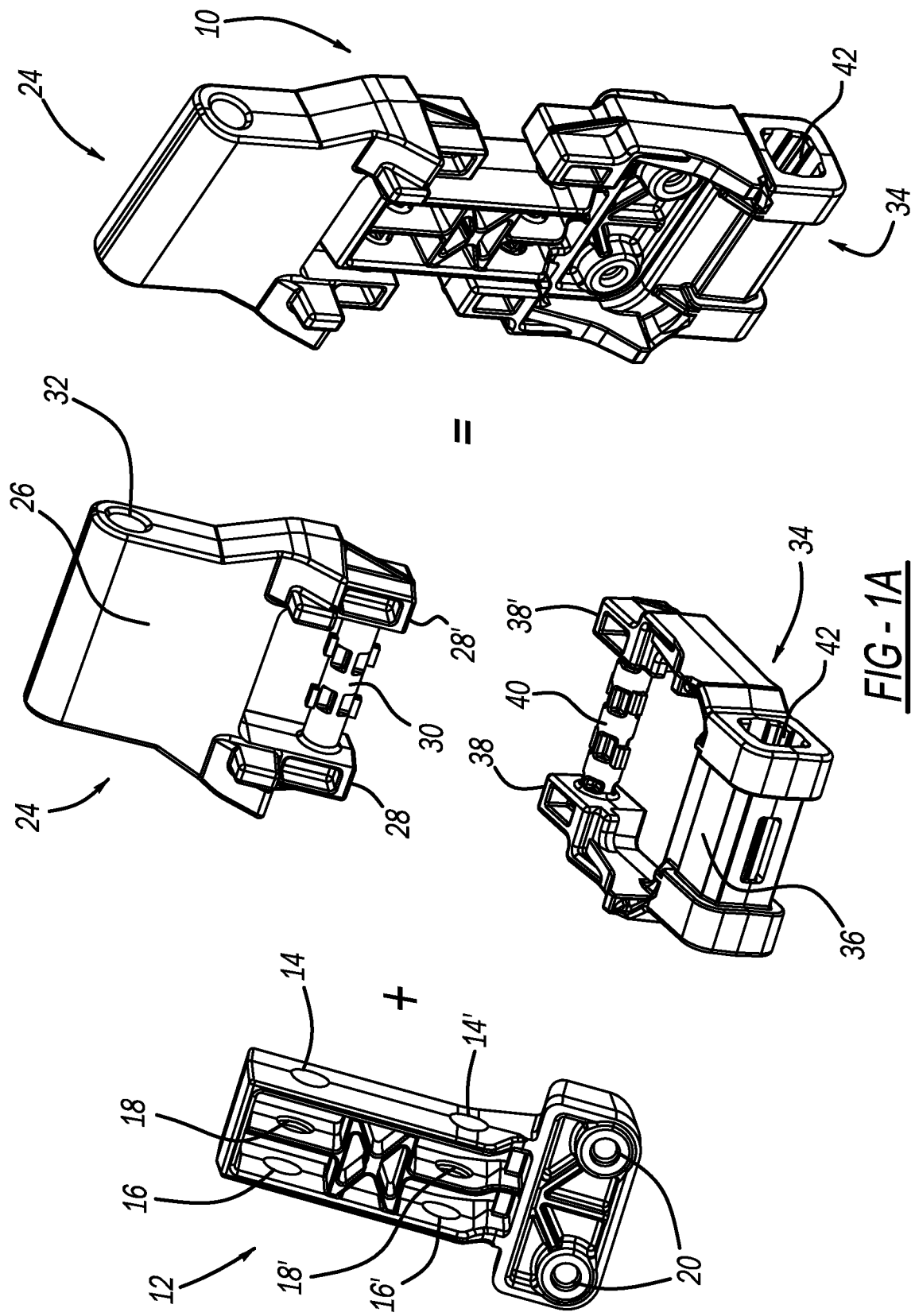
FIG. 1A is a schematic view of the 4-bar kinematic link and an overview of the method for forming the 4-bar kinematic link in accordance with a first embodiment of the present invention.
Figure 2:
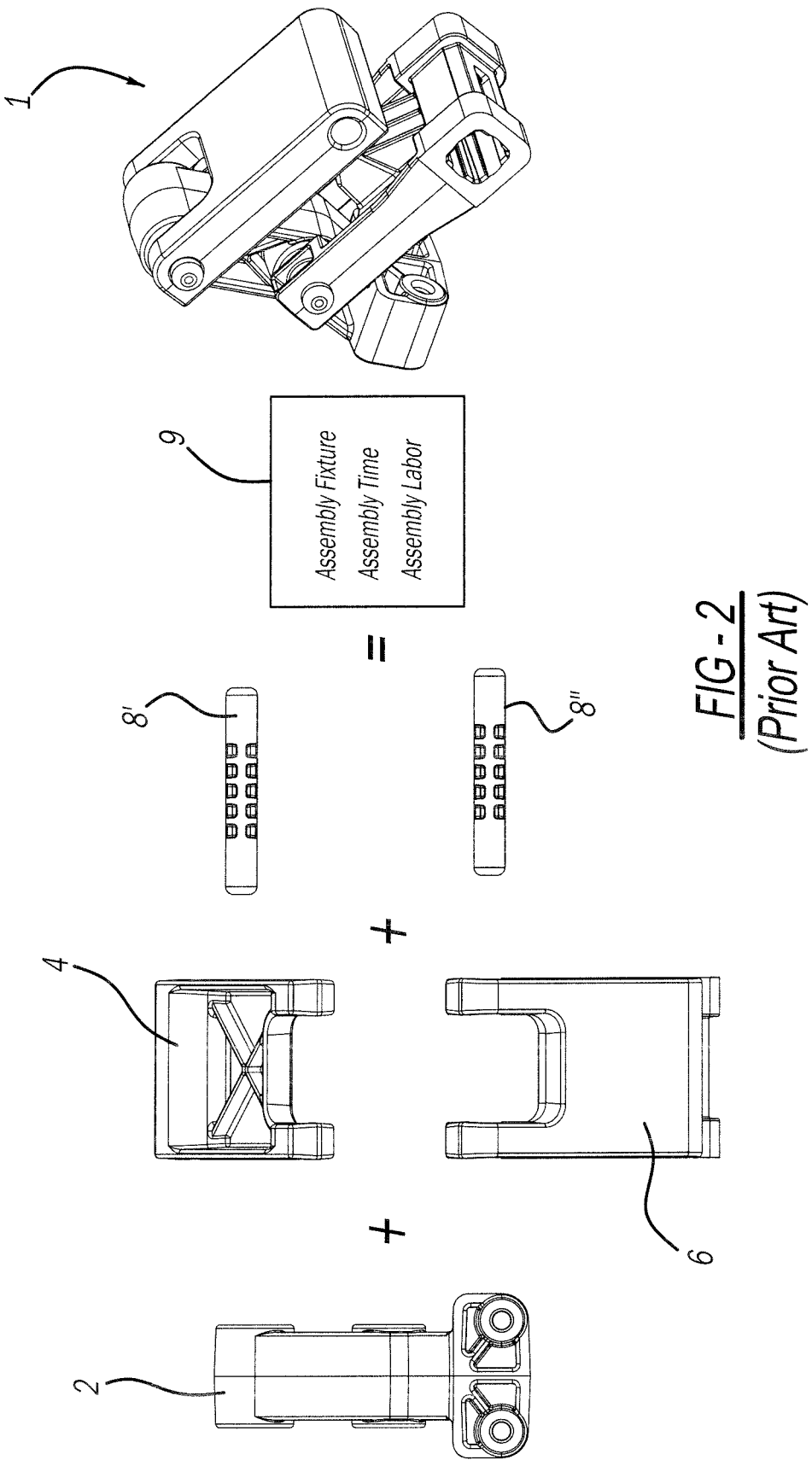
FIG. 2 is a schematic view of a prior art bracket and components.
Figure 3A:
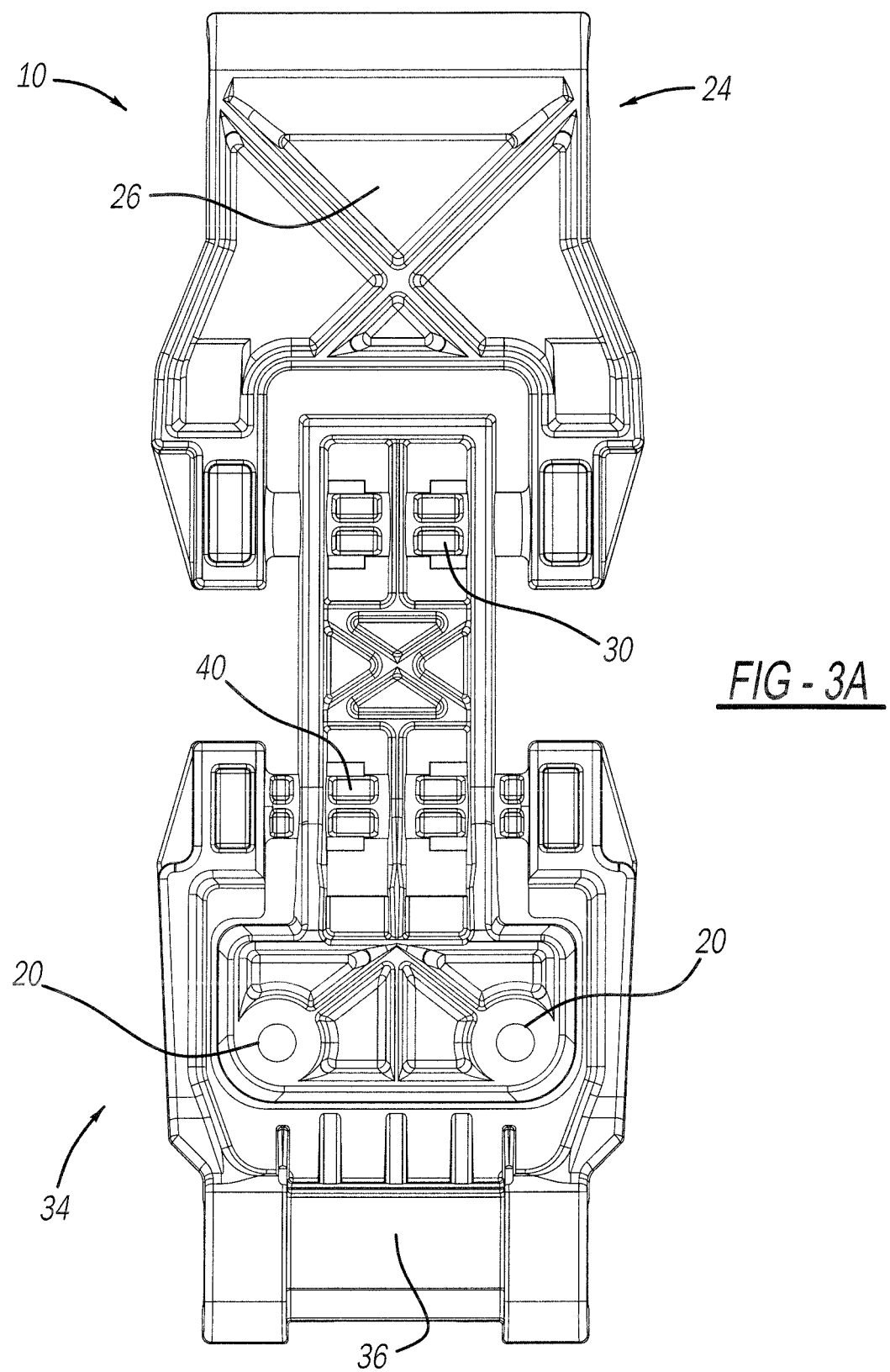
FIG. 3A is a rear isometric view of the 4-bar kinematic link according to the first embodiment of the present invention.
Figure 3B:
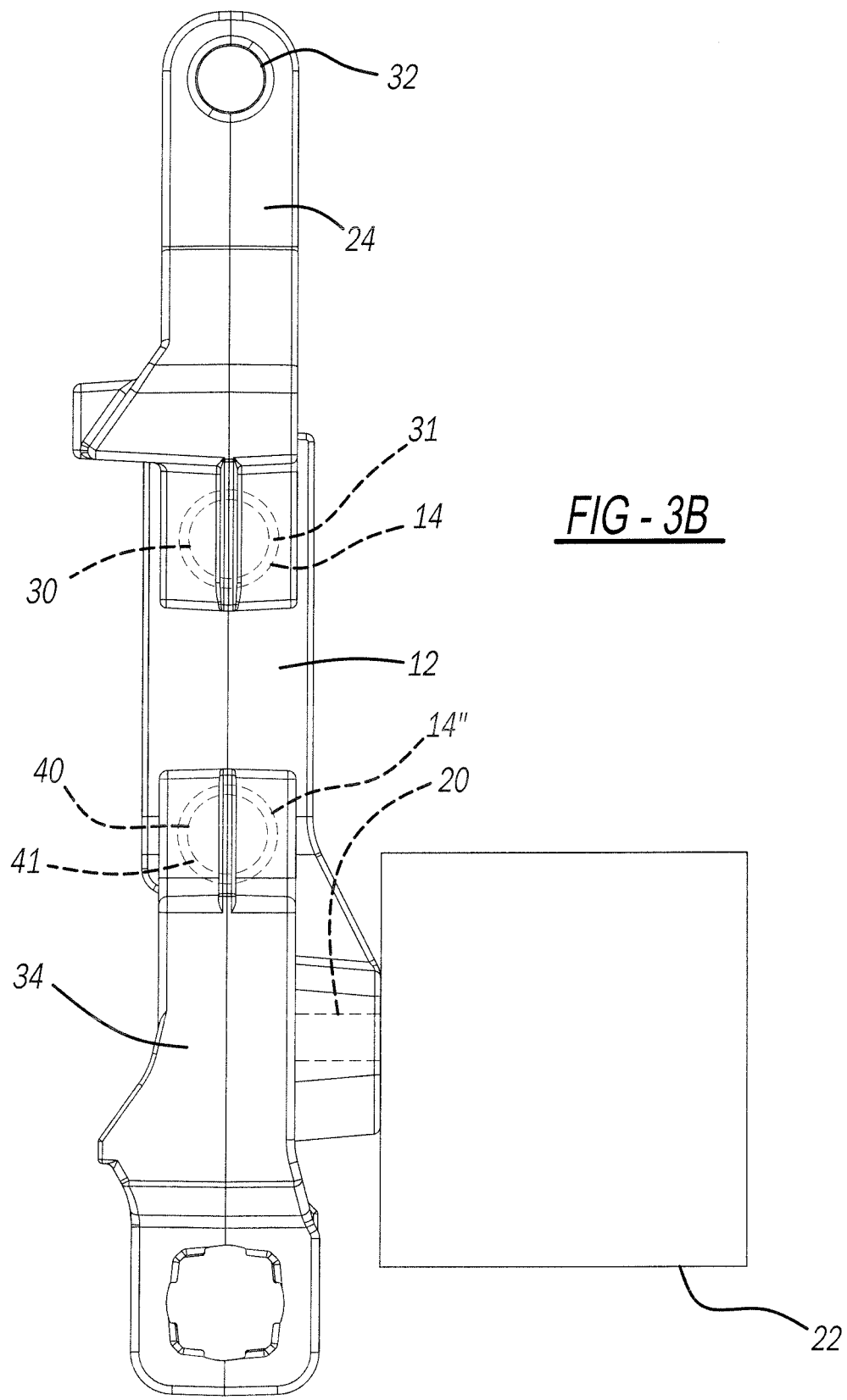
FIG. 3B is a side isometric view of the 4-bar kinematic link according to the first embodiment of the present invention.
Figure 3C:
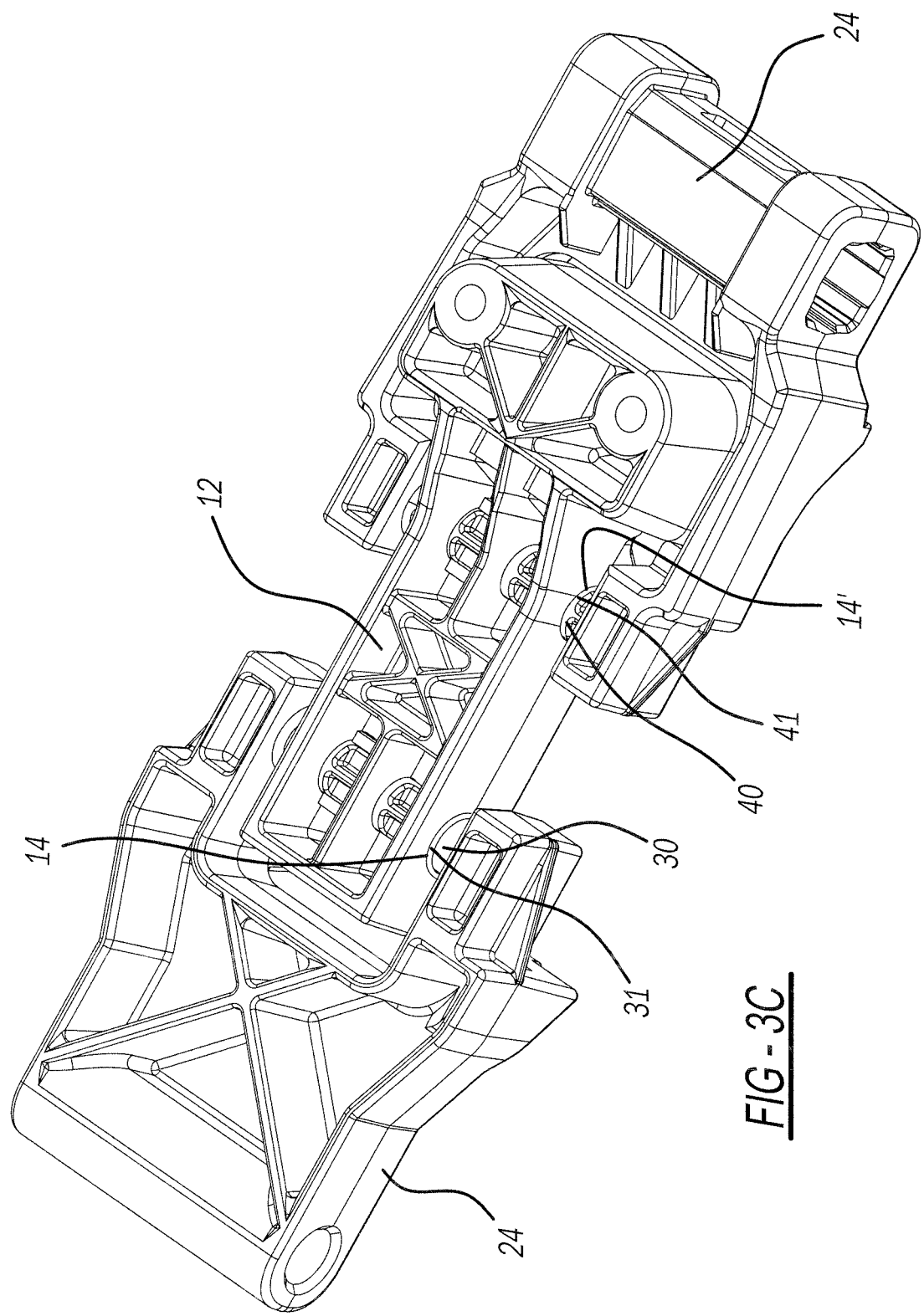
FIG. 3C is a rear perspective view of the 4-bar kinematic link according to the first embodiment of the present invention.

Referring now to FIG. 1A a schematic view of a 4-bar kinematic link 10 and an overview of the method for forming the 4-bar kinematic link in accordance with a first embodiment of the present invention is shown. Additionally FIGS. 3A, 3B and 3C show the 4-bar kinematic link 10 and components in greater detail. The 4-bar kinematic link 10 includes a base member 12 formed of composite material, having at least two sets of a plurality of apertures, where each one set includes a left side aperture 14, 14' formed through a left sidewall of the base member 12, a right side aperture 16, 16' formed through a right sidewall of the base member 12 and a middle aperture 18, 18' formed through a middle rib of the base member 12. In each one set the left side aperture 14, 14', right side aperture 16, 16' and middle aperture 18, 18' are all aligned for the purpose of allowing a hinge pin (described below) to be rotatably formed through each set of the at least two sets of a plurality of apertures. Also while three apertures (i.e., left, right and middle) are described it is within the scope of this invention for a greater or lesser number of apertures to be used in each set depending on the size of the base member 12 or design criteria of a particular application.

The base member 12 also includes a plurality of mounting apertures 20 for connecting the base member 12 to an air deflector 22 schematically shown in FIG. 3B. The connection can be made with a suitable mechanical fastener, welding, adhesives or other connection. While an air deflector 22 is depicted, it is within the scope of this invention for the air deflector 22 to be some other structure moveable by the 4-bar kinematic link 10. For example the air deflector 22 can be a vehicle bumper, active grill system components, spoiler, running board, wheel well dam, lift gate, vehicle door, trunk lid, engine hood, window regulator or any other type of automotive structure that would benefit from four bar linkage movement.

The 4-bar kinematic link 10 also includes an upper arm 24 formed of composite material. The upper arm 24 has a body 26 portion with two tabs 28, 28' extending from the body 26 and a hinge pin 30 extending between the two tabs 28, 28'. The hinge pin 30 extends rotatably through one of the at least two sets of the plurality of apertures of the base member 12. The body 26, hinge pin 30 and two tabs 28, 28' are integrally formed together as one piece and the hinge pin 30 is formed through the one of the at least two sets of the plurality of apertures of the base member 12. The body 26 of the upper arm 24 also has a mounting aperture 32 or channel that extends through the body 26. The mounting aperture is used to connect the upper arm 24 to another object in a fixed or rotational manner.

The 4-bar kinematic link 10 also includes a lower arm 34 formed of composite material. The lower arm 34 has a body 36 with two tabs 38, 38' extending from the body 36 and a hinge pin 40 extending between the two tabs 38, 38'. The hinge pin 40 extends rotatably through another one of the at least two sets for the plurality of apertures of the base member 12. The body 36, hinge pin 40 and two tabs 38, 38' are integrally formed together as one piece and the hinge pin 40 is formed through the one of the at least two sets of the plurality of apertures of the base member 12. The body 36 of the lower arm 34 also has a mounting aperture 42 or channel that extends through the body 36. The mounting aperture 42 is used to connect the lower arm 34 to another object in a fixed or rotational manner.

As will be described in greater detail below, the 4-bar kinematic link 10 is formed in a molding tool, without the need for manual assembly of the components. This provides a significant savings in the cost of producing the 4-bar kinematic link 10 when compared to the prior art assemblies. However, in order to form the 4-bar kinematic link 10 in a mold tool, the upper arm 24 and lower arm 34 must be connected to the base member 12 in a way that will allow the upper arm 24 and lower arm 34 to be pivotally connected to the base member 12. This is accomplished during the molding process by using two different shots of molten material having different shrinkage rates. With respect to the upper arm 24, this allows a clearance or gap 31 between the hinge pin 30 and the left side aperture 14, right side aperture 16 and middle aperture 18 of the base member 12 to be formed so that the hinge pin 30 can freely rotate. With respect to the lower arm 34, the shrinkage rates allow a clearance or gap 41 between the hinge pin 40 and the left side aperture 14', right side aperture 16' and middle aperture 18' of the base member 12 to be formed so that the hinge pin 40 can freely rotate.

Figure 4:
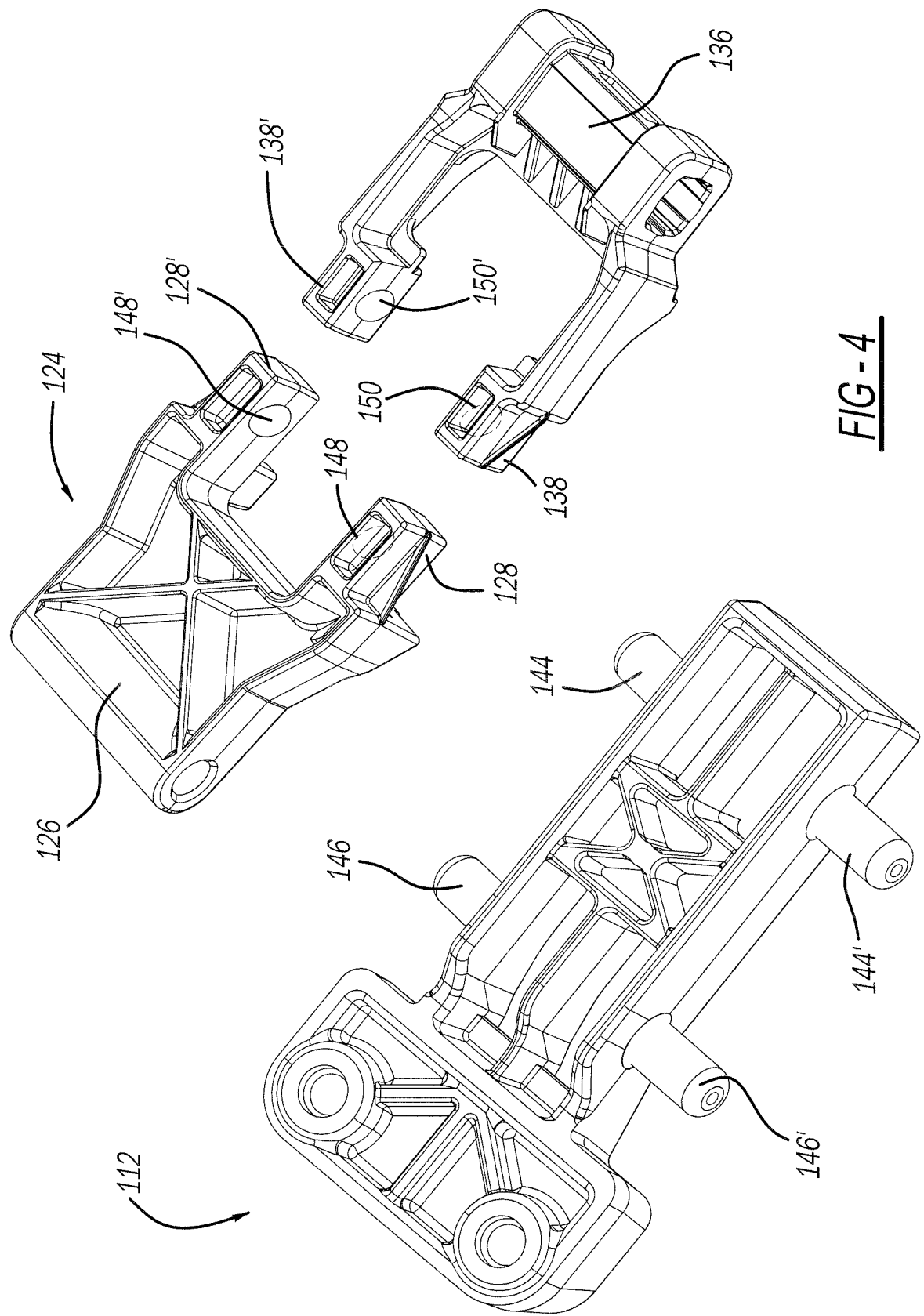
FIG. 4 is a rear perspective view of the components of the 4-bar kinematic link according to the second embodiment of the invention.

Referring now to FIG. 1B a schematic view of a 4-bar kinematic link 100 and an overview of the method for forming the 4-bar kinematic link in accordance with a second embodiment of the present invention is shown. Additionally FIG. 4 shows the 4-bar kinematic link 100 and components in greater detail. The 4-bar kinematic link 100 is a variation with the 4-bar kinematic link 10 shown in FIGS. 1A, 3A, 3B and 3C, therefore similar structures are shown with reference numbers differing by 100. The 4-bar kinematic link 100 includes a base 112 member formed of composite plastic. The base member 112 has two upper hinge pins 144, 144' extending from the surface of the base member 112 and two lower hinge pins 146, 146' extending from the surface of the base member 112. The base member 112, two upper hinge pins 144 and two lower hinge pins 146 are integrally formed together as one piece.

The 4-bar kinematic link 100 further includes an upper arm 124 formed of a composite material, the upper arm 124 having a body 126 with two tabs 128, 128' extending from the body 126 and a pivot aperture 148, 148' extending through each of the two tabs 128, 128'. Each pivot aperture 148, 148' receives one of the two upper hinge pins 144, 144' of the base member 112. The body 126 and two tabs 128, 128' are integrally formed together as one piece such that the apertures 148, 148' of the upper arm 124 are formed about the respective one of the two upper hinge pins 144, 144' of the base member 112.

The 4-bar kinematic link 100 further includes a lower arm 134 formed of a composite material, the lower arm 134 having a body 136 with two tabs 138, 138' extending from the body 136 and a pivot aperture 150, 150' extending through each of the two tabs 138, 138'. Each pivot aperture 150, 150' receives one of the two lower hinge pins 146, 146' of the base member 112. The body 136 and two tabs 138, 138' are integrally formed together as one piece such that the apertures 150, 150' of the lower arm 134 are formed about the respective one of the two lower hinge pins 150, 150' of the base member 112.

Regarding the molten materials used to form the 4-bar kinematic link 10, 100 in both embodiments described above, the base member 12, 112 is formed using a first shot of molten material, while the upper arm 24, 124 and lower arm 34, 134 are formed using a second shot of molten material. In one embodiment of the invention the first shot of molten material is polyamide material having a mold shrinkage value of about 0.5% and the second shot of molten material is a polybutylene terephthalate material having a mold shrinkage value of greater than about 0.5%. The term mold shrinkage value is a rate percentage of the volume contraction of the polymers during the cooling step of the processing of the polymers. In one exemplary embodiment of the invention the polyamide material has about 33% glass fiber filler by weight of the polyamide composite material with the glass fiber filler and the polybutylene terephthalate material has about 20% glass fiber filler by weight of the polybutylene terephthalate with a glass filler. In another embodiment of the invention the first shot of molten material is formed of polyamide material having a mold shrinkage value of about 0.003 at ⅛" bar, in/in and the second shot of molten material is polybutylene terephthalate material having a mold shrinkage value of greater than about 0.004 at ⅛" bar, in/in. In this embodiment the polyamide material has about 33% glass fiber filler by weight of the polyamide material with the glass fiber filler and the polybutylene terephthalate material has about 20% glass fiber filler by weight of the polybutylene terephthalate material with a glass filler. An example of a suitable polyamide material is Ultramid® 8233G HS BK-102 Polyamide 6 produced by BASF Corporation 1609 Biddle Avenue, Wyandotte, Mich. 48192. An example of a suitable polybutylene terephthalate material is Ultradur® B 4300 G4 PBT (Polybutylene Terephthalate) produced by BASF Corporation 1609 Biddle Avenue, Wyandotte, Mich. 48192. However, it is within the scope of this invention to use other suitable polyamide and polybutylene terephthalate materials.

Figure 5A:
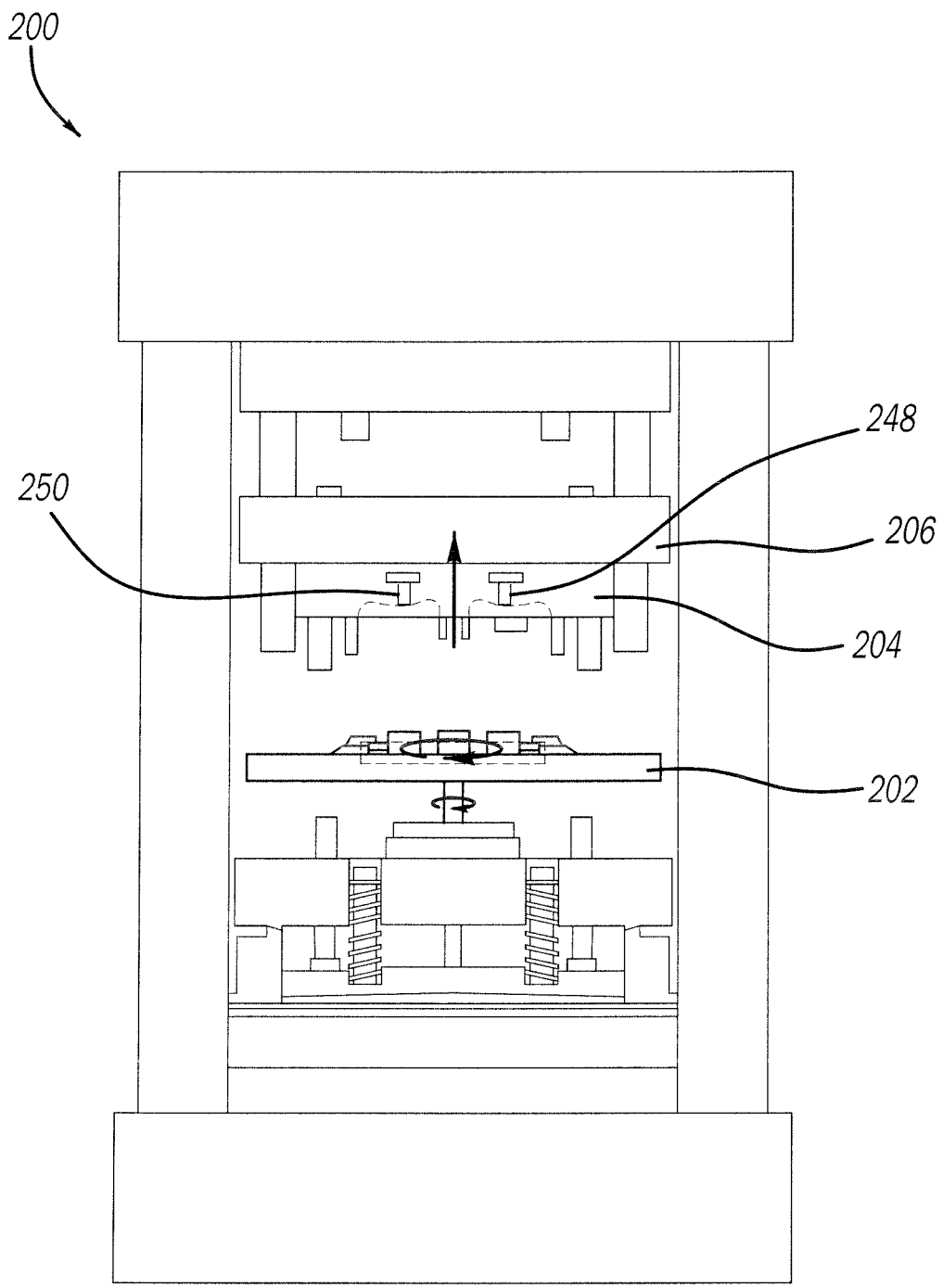
FIG. 5A is a side plan schematic view of a rotary tool for producing the 4-bar kinematic link using a method according to a third embodiment of the present invention.

FIG. 5A is a side plan schematic view of a rotary tool 200 for producing in mold the 4-bar kinematic link 10, 100 according to either of the embodiments above. The rotary tool 200 is used as part of a method of forming a 4-bar kinematic link 10, 100 and includes several steps that allow for the 4-bar kinematic link 10, 100 to be formed in the rotary tool 200 without the need for additional assembly outside of the rotary tool 200.

The rotary tool 200 has provided a rotary platen 202 rotatable at least one hundred eighty degrees, but can also rotate three hundred sixty degrees. The rotary tool 200 also includes least one linearly moveable platen 204, 206 capable of moving between an open position and a closed position relative to the rotary platen 202. The at least one linearly moveable platen 204, 206 is depicted as having two platens that can move independently of each other and provide different mold surface variations. It is within the scope of this invention for a greater or lesser number of platens to be used.

Figure 5B:
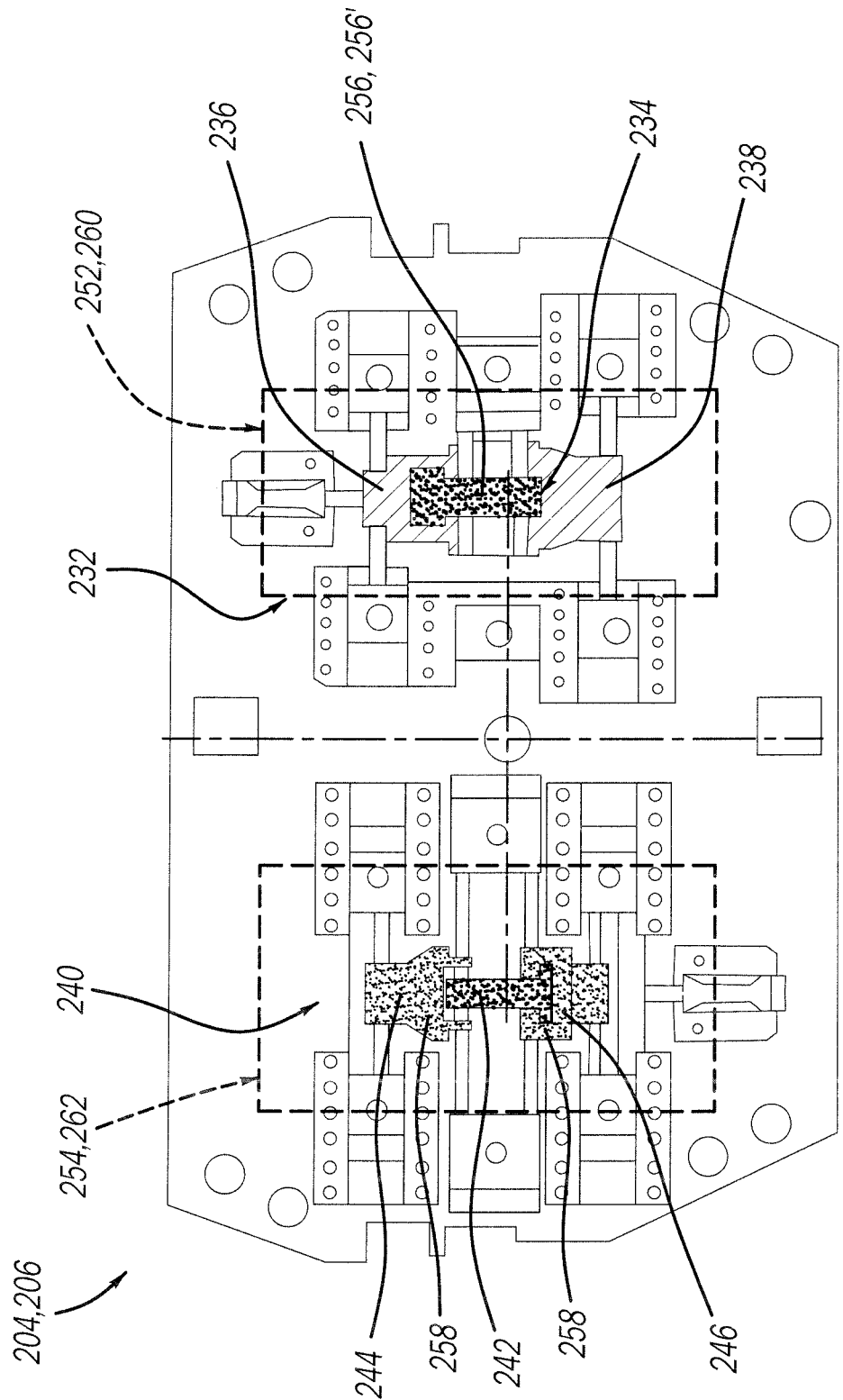
FIG. 5B is a top plan schematic view of the linearly moveable platen.
Figure 5C:
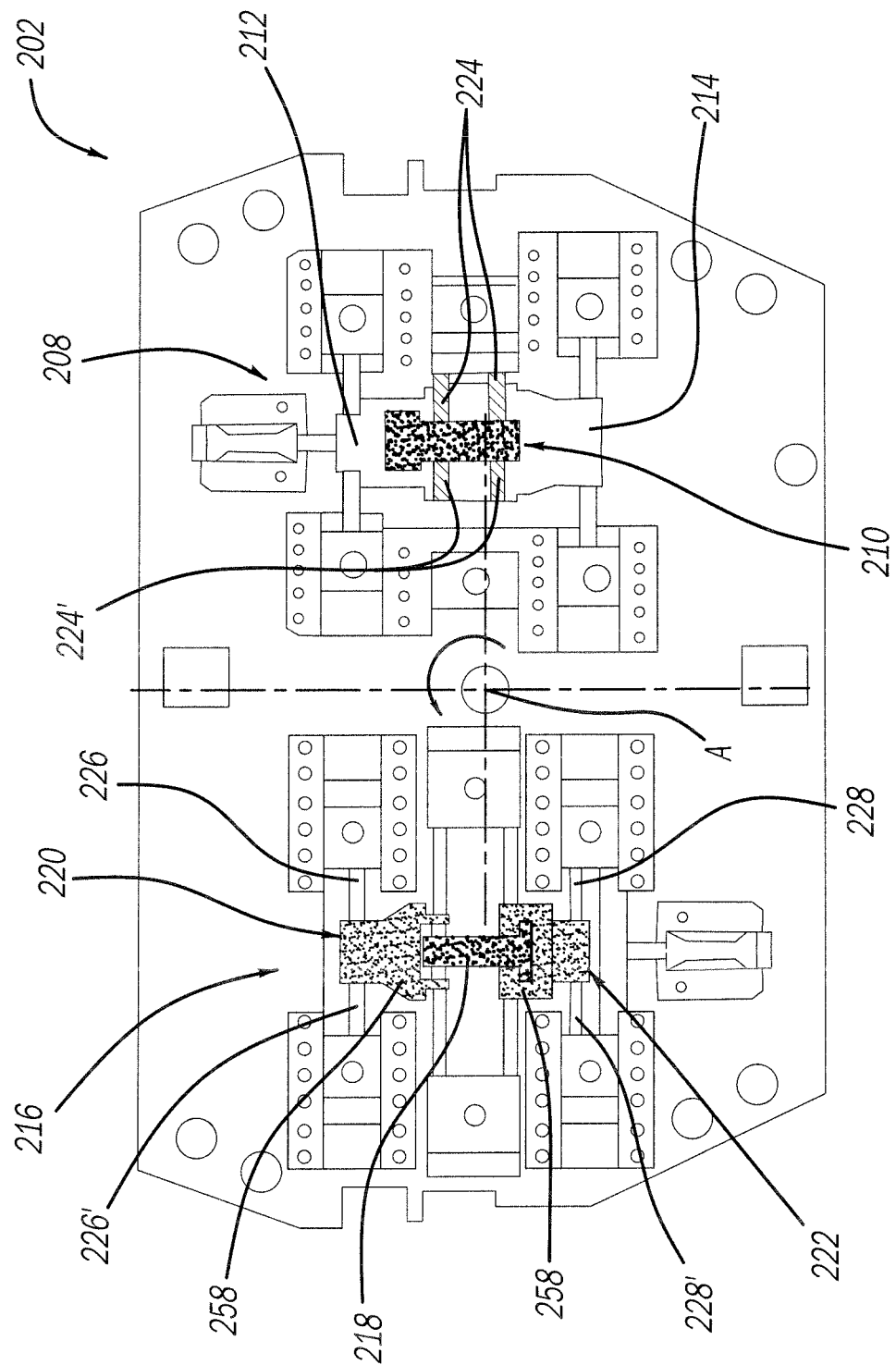
FIG. 5C is a top plan schematic view of the rotary platen.

FIG. 5C is a plan view showing the details of the rotary platen 202 includes a first forming region 208 having a rotary base member forming surface 210, a rotary upper arm forming surface 212 and a rotary lower arm forming surface 214, a second forming region 216 having a rotary base member forming surface 218, a rotary upper arm forming surface 220 and a rotary lower arm forming surface 222.

In order to form the left side apertures 14, 14', right side apertures 16, 16' and middle apertures 18, 18' in the base member 12 shown in FIG. 1A, the first forming region 208 and second forming region 216 include base member pins 224, 224' that are pins capable of moving between an extended and retracted position across the rotary base member forming surface 210, 218 of the two forming regions. When molten resin is injected at the base member 12, 112 will form around the base member pins 224, 224' to create the apertures in the base member 12, 112.

In order to form the mounting aperture 32 of the upper arm 24 and the mounting aperture 42 of the lower arm 34 shown in FIG. 1A, the first forming region 208 and second forming region 216 include upper mounting aperture pins 226, 226' and lower mounting aperture pins 228, 228'. The upper mounting aperture pins 226, 226' move between extended and retracted positions across the rotary upper arm forming surface 212, 220. The lower mounting aperture pins 228, 228' move between extended and retracted positions across the rotary lower arm forming surface 214, 222. When molten resin is injected each mounting aperture will form around the respective upper mounting aperture pins 226, 226' or lower mounding aperture pins 228, 228'.

FIG. 5B depicts a plan view of the at least one linearly moveable platen 204, 206 which has a first forming region 232 having a linear base member forming surface 234, a linear upper arm filler surface 236 and a linear lower arm filler surface 238. The at least one linearly moveable platen 204, 206 includes a second forming region 240 having a linear base member forming surface 242, a linear upper arm forming surface 244 and a linear lower arm forming surface 246.

Referring back to FIG. 5A the at least one linearly movable platen 204, 206 includes at least one first shot injection port 248 for injecting a first shot of molten material into the first forming region 232 of the at least one linearly moveable platen 204, 206. There is also at least one second shot injection port 250 for injecting a second shot of molten material into the second forming region 240 of the at least one linearly moveable platen 204, 206. The type of molten material used is described above.

Referring now to FIGS. 5A, 5B and 5C the steps of forming of the 4-bar kinematic link 10, 100 using the rotary tool 200 are described. During a first step the at least one linearly moveable platen 204, 206 is moved toward the at least one rotary platen 202 so that the two meet creating a first base member molding cavity 252, which is a closed cavity defined by the first forming region 208 of the rotary platen 202 and the first forming region 232 of the at least one linearly moveable platen 204, 206. Also this step of moving includes creating a first arm member molding cavity 254 which is a closed cavity defined by the second forming region 216 of the rotary platen 202 and the second forming region 240 of the at least one linearly moveable platen 204, 206.

Next the method includes injecting a first shot of molten material 256 through the at least one first shot injection port 248 into the first base member molding cavity 252 and forming a base member 12, 112 from the first shot of molten material 256. The first shot of molten material 256 is restricted to flowing into only into the rotary base member forming surface 210 of the first forming region 208 and linear base member forming surface 234 of the first forming region 232 because the rotary upper arm forming surface 212 and rotary lower arm forming surface 214, both of the first forming region 208, are blocked or filled by the respective linear upper arm filler surface 236 and linear lower arm filler surface 238, both of the first forming region 232. The linear upper arm filler surface 236 and linear lower arm filler surface 238 both are filler pieces that are configured to fill or block the flow of the first shot of molten material 256 and confine the first shot of molten material 256 to the rotary base member forming surface 210 of the first forming region 208 and the linear base member forming surface 234 of the first forming region 232. The first shot of molten material 256 is then cured creating the base member 12, 112.

Next the method includes opening the first base member molding cavity 252 and the first arm member molding cavity 254 by moving the at least one linear moveable platen 204, 206 away from the at least one rotary platen 202. The formed base member 12, 112 stays on the surface of the rotary base member forming surface 210 of the first forming region 208 of the rotary platen 202.

Next the method includes rotating the at least one rotary platen 202 about an axis A so that first forming region 208 and the formed base member 12, 112 become aligned with the second forming region 240 of the at least one liner moveable platen 204, 206. Next the method includes moving the at least one linearly moveable platen 204, 206 toward the at least one rotary platen 202 and creating a second base member molding cavity 260 which is a closed cavity defined by the second forming region 216 of the rotary platen 202 and the first forming region 232 of the at least one linearly moveable platen 204, 206 and creating a second arm member molding cavity 262 which is a closed cavity defined by the first forming region 208 of the rotary platen 202 and the second forming region 216 of the at least one linearly moveable platen 204, 206, wherein the formed base member 12, 112 is contained within the second arm member molding cavity 262.

Next the method includes injecting a second shot of molten material 258 through the at least one second shot injection port 250 into the second arm member molding cavity 262 to form an upper arm member 24, 124 and lower arm member 34, 134.

When forming the base member 12 the second shot of molten material 258 flows into contact with and between the rotary upper arm forming surface 212 and the linear upper arm forming surface 244 and the second shot of molten material 258 flows through an upper set of apertures, that is the left side aperture 14, right side aperture 16 and middle aperture 18, in the base member 12 to form the 30 hinge pin portion of the upper arm 24. The second shot of molten material 258 will also flow into contact with and between the rotary lower arm forming surface 214 and the linear lower arm forming surface 246 and the second shot of molten material 258 flows through a lower set of apertures in the base member 12, that is the left side aperture 14', right side aperture 16' and middle aperture 18', in the base member 12 to form the hinge pin 40 portion of the lower arm 34.

When forming the base member 112 the hinge pins are already formed as part of the base member 112, therefore the second shot of molten material 258 will just flow around the surface of the upper hinge pins 144, 144' and lower hinge pins 146, 146' shown in FIG. 1B.

Next the method includes curing the second shot of molten material 258 in the second arm member molding cavity 262 for form the 4-bar kinematic link 10. During this step, the second shot of molten material 258 shrinks thereby creating a clearance (described above in and shown in FIG. 3B) between the hinge pin 30 of the upper arm 24 and the upper set of apertures in the base member 12 to allow the hinge pin 30 of the upper arm 24 to rotate freely about the upper set of apertures in the base member 12. Also created is a clearance (described above in and shown in FIG. 3B) between the hinge pin 40 of the lower arm 34 and the lower set of apertures in the base member 12 to allow the hinge pin 40 of the lower arm 34 to rotate freely in the lower set of apertures in the base member 12.

When forming the base member 112 the hinge pins are already formed as part of the base member 112, therefore the second shot of molten material 258 will just flow around the surface of the upper hinge pins 144, 144' and lower hinge pins 146, 146' shown in FIG. 1B.

Next the method includes injecting a first shot of molten material 256' through the at least one first shot injection port 248 into the second base member molding cavity 260 and forming a second base member from the first shot of molten material 256'. This step allows for the simultaneous formation of a second bases member while the second shot of molten material 258 is being injected into the second arm member forming cavity 262.

A final step of the method includes moving the at least one linearly moveable platen 204, 206 away from the at least one rotary platen 202 and removing the finished 4-bar kinematic link 10, 100. After this step the rotary platen 202 can rotate again to move the formed second base member into alignment to reform the first arm member molding cavity 254, which will have the second base member ready for receiving a second shot of molten material according to the steps described above.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

The invention claimed is:

1. A 4-bar kinematic link comprising:
a 4-bar kinematic link having a base member, an upper arm rotatably connected to the base member and a lower arm rotatably connected to the base member;
the base member is formed of composite material, having at least two sets of a plurality of apertures formed on a surface of the base member;
the upper arm is formed of composite material, the upper arm having a body with two tabs extending from the body and a hinge pin extending between the two tabs, the hinge pin extends rotatably through one of the at least two sets of the plurality of apertures of the base member, wherein the body of the upper arm, hinge pin of the upper arm and two tabs of the upper arm are formed together as a monolithic one piece and the hinge pin is rotatably formed through the one of the at least two sets of the plurality of apertures of the base member;
the lower arm formed of composite material, the lower arm having a body with two tabs extending from the body and a hinge pin extending between the two tabs, the hinge pin extends rotatably through another one of the at least two sets for the plurality of apertures of the base member, wherein the body of the lower arm, hinge pin of the lower arm and two tabs of the lower arm are formed together as a monolithic one piece and the hinge pin is formed through the another one of the at least two sets of the plurality of apertures of the base member; and
wherein the base member is formed of polyamide material having a mold shrinkage value of 0.5% and the upper arm and lower arm are formed of polybutylene terephthalate material having a mold shrinkage value of greater than 0.5%.

2. The 4-bar kinematic link of claim 1 wherein each of the at least two sets of the plurality of apertures includes a left side aperture, a right side aperture and a middle aperture all formed in the base member.

3. The 4-bar kinematic link of claim 1 wherein the base member further includes a plurality of mounting apertures for connecting the base member to a composite air deflector.

4. The 4-bar kinematic link of claim 1 wherein the polyamide material has 33% glass fiber filler by weight of the polyamide composite material with the glass fiber filler and the polybutylene terephthalate material has 20% glass fiber filler by weight of the polybutylene terephthalate with a glass filler.

5. The 4-bar kinematic link of claim 1 wherein the base member is formed of polyamide material having a mold shrinkage value of 0.003 at ⅛" bar, in/in and the upper arm and lower arm are formed of polybutylene terephthalate material having a mold shrinkage value of greater than 0.004 at ⅛" bar, in/in.

6. The 4-bar kinematic link of claim 5 wherein the polyamide material has 33% glass fiber filler by weight of the polyamide material with the glass fiber filler and the polybutylene terephthalate material has 20% glass fiber filler by weight of the polybutylene terephthalate material with a glass filler.

7. The 4-bar kinematic link of claim 1 wherein the body of the lower arm has a mounting aperture and the body of the upper arm has a mounting aperture.

8. A 4-bar kinematic link comprising:
   a base member formed of composite material, having at least two sets of a plurality of apertures formed on a surface of the base member;
   an upper arm formed of composite material, the upper arm having a body with two tabs extending from the body and a hinge pin extending between the two tabs, the hinge pin extends rotatably through one of the at least two sets of the plurality of apertures of the base member, wherein the body of the upper arm, the hinge pin of the upper arm and the two tabs of the upper arm are formed together as a monolithic one piece and the hinge pin is rotatably formed through the one of the at least two sets of the plurality of apertures of the base member;
   a lower arm formed of composite material, the lower arm having a body with two tabs extending from the body and a hinge pin extending between the two tabs, the hinge pin extends rotatably through another one of the at least two sets for the plurality of apertures of the base member, wherein the body of the lower arm, the hinge pin of the lower arm and the two tabs of the lower arm are formed together as a monolithic one piece and the hinge pin is formed through the another one of the at least two sets of the plurality of apertures of the base member;
   wherein the polyamide material has 33% glass fiber filler by weight of the polyamide material with the glass fiber filler and the polyamide material has a mold shrinkage value of 0.003 at ⅛" bar, in/in, and
   wherein the polybutylene terephthalate material has 20% glass fiber filler by weight of the polybutylene terephthalate material with a glass filler and the polybutylene terephthalate material of the upper arm and the lower arm has a mold shrinkage value of greater than 0.004 at ⅛" bar, in/in.

9. The 4-bar kinematic link of claim 8 wherein each of the at least two sets of the plurality of apertures includes a left side aperture, a right side aperture and a middle aperture all formed in the base member.

10. The 4-bar kinematic link of claim 8 wherein the base member further includes a plurality of mounting apertures for connecting the base member to a composite air deflector.

* * * * *